(12) United States Patent
Shevchenko et al.

(10) Patent No.: US 9,391,319 B2
(45) Date of Patent: Jul. 12, 2016

(54) HOLLOW NANOPARTICLE CATHODE MATERIALS FOR SODIUM ELECTROCHEMICAL CELLS AND BATTERIES

(71) Applicant: UCHICAGO ARGONNE, LLC, Chicago, IL (US)

(72) Inventors: Elena Shevchenko, Riverside, IL (US); Tijana Rajh, Naperville, IL (US); Christopher S. Johnson, Lemont, IL (US); Bonil Koo, Walnut Creek, CA (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 247 days.

(21) Appl. No.: 14/133,137

(22) Filed: Dec. 18, 2013

(65) Prior Publication Data

US 2015/0171419 A1    Jun. 18, 2015

(51) Int. Cl.
*H01M 4/525* (2010.01)
*H01M 10/054* (2010.01)
*H01M 4/36* (2006.01)
*H01M 4/587* (2010.01)
*H01M 10/0568* (2010.01)
*H01M 10/0569* (2010.01)

(52) U.S. Cl.
CPC .............. *H01M 4/366* (2013.01); *H01M 4/364* (2013.01); *H01M 4/525* (2013.01); *H01M 4/587* (2013.01); *H01M 10/054* (2013.01); *H01M 10/0568* (2013.01); *H01M 10/0569* (2013.01); *Y02E 60/122* (2013.01)

(58) Field of Classification Search
CPC ...... H01M 4/366; H01M 4/523; H01M 4/583
USPC .............. 429/188, 341, 223, 231.1, 221, 156, 429/224, 231.9, 231.95
See application file for complete search history.

(56) References Cited

U.S. PATENT DOCUMENTS

| 7,867,463 B2 | 1/2011 | Hyeon et al. |
| 2002/0061441 A1* | 5/2002 | Ogura et al. ............... 429/218.1 |

OTHER PUBLICATIONS

Koo, B. et al., Intercalation of Sodium Ions Into Hollow Iron Oxide Nanoparticles, Chem. Mater. (2013), vol. 25, 245-252.
Koo, B. et al., Intercalation of Sodium Ions Into Hollow Iron Oxide Nanoparticles, Chem. Mater. (2013), vol. 25, On-Line Supplemental Supporting Material, pp. S-1 to S-12.
Koo, B. et al., Hollow Iron Oxide Nanoparticles for Application in Lithium Ion Batteries, Nano Lett. (2012) vol. 12, 2429-2435.

(Continued)

*Primary Examiner* — James Lee
(74) *Attorney, Agent, or Firm* — Olson & Cepuritis, Ltd.

(57) ABSTRACT

A cathode comprises, in its discharged state, a layer of hollow $\gamma$-$Fe_2O_3$ nanoparticles disposed between two layers of carbon nanotubes, and preferably including a metallic current collector in contact with one of the layers of carbon nanotubes. Individual particles of the hollow $\gamma$-$Fe_2O_3$ nanoparticles comprise a crystalline shell of $\gamma$-$Fe_2O_3$ including cation vacancies within the crystal structure of the shell (i.e., iron vacancies of anywhere between 3% to 90%, and preferably 44 to 77% of available octahedral iron sites). Sodium ions are intercalated within at least some of the cation vacancies within the crystalline shell of the hollow $\gamma$-$Fe_2O_3$ nanoparticles.

24 Claims, 3 Drawing Sheets

(56) References Cited

OTHER PUBLICATIONS

Koo, B. et al., Hollow Iron Oxide Nanoparticles for Application in Lithium Ion Batteries, Nano Lett. (2012) vol. 12, On-Line Supplemental Supporting Material, pp. S-1 to S-25.

Ellis, B.L. et al., Sodium and Sodium-Ion Energy Storage Batteries, Current Opinions in Solid State and Materials Science (2012), vol. 16, 168-177.

Wang, Z. et al., Metal Oxide Hollow Nanostructures for Lithium-Ion Batteries, Adv. Mater. (2012), vol. 24, 1903-1911.

Xie, J. et al., One-Pot Synthesis of Monodisperse Iron Oxide Nanoparticles for Potential Biomedical Applications, Pure Appl. Chem. (2006) vol. 78, No. 5, 1003-1014.

Cabot, A. et al., Vacancy Coalescence During Oxidation of Iron Nanoparticles, published as: J. Am. Chem. Soc., (2007) vol. 129, 10358-10360.

\* cited by examiner

HOLLOW NANOPARTICLE CATHODE MATERIALS FOR SODIUM ELECTROCHEMICAL CELLS AND BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to energy storage devices, notably non-aqueous electrochemical cells and batteries and, more particularly, non-aqueous sodium electrochemical cells and batteries, and cathodes therefor.

BACKGROUND

Discovery and development of new materials for ambient temperature sodium batteries are increasing, with the goal of providing energy storage to, for example, grid applications throughout the world. Generation of energy arising from renewable resources, such as conversion of wind, solar or wave sources must be stored in batteries for later use. There are a number of storage technologies that dominate the present market, such as large Li-ion batteries, aqueous Na batteries, high temperature liquid Na based batteries, and others, but the lifetime, safety, up front capital costs, and too low energy densities plague these technologies. In addition, power pulse characteristics are critically important to negotiate generation peak fluctuations in the grid. Many of these technologies also fall short of this demand.

Cost is an issue when large-scale grid storage systems are built, because of their massive size (MWh levels), therefore one would like to replace Li-ion based batteries since they are expensive, are subject to price fluctuations in the market (due to transportation, and consumer applications), and lithium reserves may be limited. On the other hand sodium-based batteries clearly will have the promise of low-cost due to abundant Na precursors used to make electrodes. Furthermore, iron-based electrode materials, discussed in this background also consist of Earth-abundant elements for the application.

However, sodium-based batteries have the disadvantage that there are limited electrode materials capable of inserting Na reversibly due to the large size of the atom and it's cation (for charge storage). In this regard, it is possible to employ nanomaterials that can use their high-surface area for concentration of sodium cations at the surface, and their defect vacancies in the structure that will enable the Na cations to insert into such vacancies. Bulk materials, in contrast, typically do not have such defects and vacancies.

Controlled electrode architectures that are formed with nanostructures are increasingly being used as electrodes for batteries, as they provide good high-power pulses, long life and decent energy densities. Many nanostructured materials are better than ultracapacitors or pseudocapacitors in terms of energy density, but have higher power characteristics greater than conventional intercalation laminate-type electrodes in batteries.

For materials with nanosized dimensions, the surface area is increased, and thus the importance of interfaces and surfaces is elevated. Material properties like voltage profiles, charge-discharge curves, and also phase diagrams can be affected. Improved storage properties, and materials that are inactive at the micro size can become excellent storage materials when nanosized. In this context, therefore, novel surface storage mechanisms might explain these phenomena. Phase transitions, such as those that are first-order, and which are responsible for the constant voltage output of batteries, can be suppressed at the nanoscale. Since the phase transitions may be muddled, the morphological transitions or transformations of the actual nanoparticle can affect the chemistry. However, the speed of cation diffusion along the surface of the nanoparticle is known to be extremely fast due to the short nanosized dimension and curved surfaces. This can allow large cations to reach intercalation sites, particularly defect vacancies with fast charge transfer throughout the particle. The availability of interstitial sites for the cations can be a general problem in dense lattices that are fully filled. As a result, the capacities and associated energy will be lower and may mimic micron sized particles. The power may be increased, but the high surface areas also can lead to unwanted side reactions. A balance is needed between all of these properties.

In $Li^+$ ion batteries, anodes made from solid nanoparticles and microparticles, as well as hollow nanostructures (e.g., $TiO_2$, $Co_3O_4$, $SnO_2$, $CuO$, and $\alpha$-$Fe_2O_3$) have been evaluated. Also, hollow structures of lithiated layered oxides such as $LiNi_{0.5}Mn_{1.5}O_4$ and $LiMn_2O_4$ have been used as cathode materials.

New strategies for replacing lithium ion batteries with energy storage systems based on more Earth-abundant elements are needed because of limited lithium sources. Sodium ion batteries are promising candidates for large-scale energy storage systems owing to the abundance and low cost of sodium. However, it has been difficult to find appropriate Na electrode materials since the large size of the sodium ion often leads to rather limited intercalation or extrusion into and out of active electrode materials. As a result, materials that efficiently work with lithium ions often either do not work at all of sodium ions, or show very limited activity with sodium ions. The use of layered and tunnel-type oxides and phosphates have been proposed for batteries based on Na ions to address the problems associated with sodium ion batteries. Bulk materials (i.e., relatively large particle size materials) have demonstrated relatively low capacity and cyclability (<130 mAh/g at rate slower than 0.1 C), compared to nanostructured materials, which have been reported to produce higher capacity and better cyclability. For example, Cao et al. (*J. Phys. Chem. C*, 2008; 112: 1851) reported a capacity of about 128 mAh/g with 77% capacity retention after 1000 slow rate (0.5 C) cycles for a Na ion cathode made from manganese oxide nanowires. Nanostructured bilayered vanadium oxide-based cathodes reportedly demonstrated reversible (250 mAh/g) capacity at slow rate (20 mA/g, 0.125 C) cycling with $Na^+$ ions up to 350 cycles (Tepavcevic et al. *ACS Nano*, 2012; 6: 530). Also, amorphous $TiO_2$ nanotubes reportedly have exhibited promising performance cycled at a high rate as an anode for $Na^+$ ion batteries (Xiong et al., *J. Phys. Chem. Lett.*, 2011; 2: 2560).

There is an ongoing need for new electrode materials for sodium ion electrochemical cells and batteries, as alternatives to lithium ion-based materials. The electrodes, electrochemical cells, and batteries described herein address this need.

SUMMARY OF THE INVENTION

In this invention nanomaterials that are hollow and contain vacancies have been identified for use either as charged, but preferably discharged cathodes in ambient temperature sodium and sodium-ion batteries.

Crystal lattice vacancies are a common result of nanoparticle synthesis, therefore, the mechanism of insertion of Na cations into the matrix is partially dictated by the number of vacancies in the material. The higher the number of vacancies, the higher the capacity will be. Hollow nanoparticles are also important for maximizing the capacity, because the interior of the shell can adsorb Na cations at a high voltage.

Cation vacancies in hollow $\gamma$-$Fe_2O_3$ nanoparticles (NP) are utilized for efficient sodium ion transport. As a result, fast rechargeable cathodes can be assembled from Earth-abundant elements such as iron oxide and sodium. In situ structural and electronic transformations of hollow iron oxide nanoparticles by synchrotron X-ray adsorption and diffraction techniques have revealed that the cation vacancies in hollow $\gamma$-$Fe_2O_3$ nanoparticles can serve as hosts for sodium ions in a relatively high voltage range (4.0-1.1 V). Encapsulation of hollow $\gamma$-$Fe_2O_3$ nanoparticles between two layers of carbon nanotubes provides light-weight, flexible, and stable electrodes for sodium ion cells, which can be fabricated without binder (i.e., binder-free). The Coulombic efficiency of the electrodes and electrochemical cells disclosed herein at different cycling rates can be affected by the choice of electrolyte salt (e.g., $NaPF_6$ or $NaClO_4$).

Detailed studies using synchrotron X-ray adsorption and diffraction techniques (XANES/EXAFS and XRD) and electron microscopy analysis (TEM), directed toward understanding of $Na^+$ ion intercalation into and deintercalation out of iron oxide NPs enriched with a high concentration of cation vacancies are disclosed herein. $Na^+$ ion intercalation into cation vacancies of hollow $\gamma$-$Fe_2O_3$ NPs provides for fast rechargeable cathodes from Earth-abundant elements such as iron oxide and sodium. Thus, hollow $\gamma$-$Fe_2O_3$ NPs (13.6 nm average diameter) cycled with $Na^+$ ions provide capacities up to 189 mAh/g, excellent Coulombic efficiency (99.0%), good capacity retention, and superior rate performance (99 mAh/g at 3000 mA/g (50 C)).

In one aspect, the present invention provides a cathode for a sodium ion electrochemical cell. The cathode comprises, in a discharged state, a layer of hollow $\gamma$-$Fe_2O_3$ nanoparticles disposed between two layers of carbon nanotubes, which serve as a current collector (no separate current collector is needed, although a separate metal current collector can be used, if desired). Individual particles of the hollow $\gamma$-$Fe_2O_3$ nanoparticles comprise a crystalline shell of $\gamma$-$Fe_2O_3$ including cation vacancies within the crystal lattice of the shell (i.e., iron vacancies of anywhere between 3% to 90%, and preferably 44 to 77% of available iron sites). Sodium ions are intercalated within at least some of the cation vacancies within the crystalline shell of the hollow $\gamma$-$Fe_2O_3$ nanoparticles. Preferably, the hollow $\gamma$-$Fe_2O_3$ nanoparticles intercalate about 1 to about 1.5 moles of sodium ions per mole of $\gamma$-$Fe_2O_3$ in the discharged state.

As used herein with respect to a cathode for a sodium ion electrochemical cell, the term "discharged state" and grammatical variations thereof, refers to a cathode in "fully discharged" or "partially discharged" states, i.e., to a cathode that includes its maximum capacity of intercalated sodium ions (the "fully discharged" cathode) and to a cathode that contains intercalated sodium ions, but at less than capacity (a "partially discharged" cathode). A "fully charged" cathode as described herein includes no intercalated sodium ions or a minimum average amount of intercalated sodium ion in the nanoparticles. The minimum level of sodium intercalation can be determined by electrochemical and analytical evaluations that are well known to those of ordinary skill in the battery art. Advantageously, the cathode can be constructed without any binder added to the $\gamma$-$Fe_2O_3$ nanoparticles and carbon nanotubes.

In preferred embodiments, the layer of hollow $\gamma$-$Fe_2O_3$ nanoparticles of the cathode also comprises carbon nanotubes admixed therewith. Preferably, the hollow $\gamma$-$Fe_2O_3$ nanoparticles have an average particle size in the range of about 3.5 to about 17 nm, and individual nanoparticles comprise a crystalline $\gamma$-$Fe_2O_3$ shell having an average thickness in the range of about 1.1 to about 6 nm.

The carbon nanotubes can comprise single wall and/or multiwall nanotubes with the tube diameter of about 1.5 to about 15 nm. The lengths of CNTs are varied, and generally fall in the range of about 1 to about 25 microns. Similarly, the carbon nanotubes admixed with the hollow $\gamma$-$Fe_2O_3$ nanoparticles preferably have substantially the same dimensions as the tubes used to sandwich the active material.

The present invention also provides a sodium ion electrochemical cell comprising the cathode described above. In one embodiment, the electrochemical cell comprises a cathode in combination with an anode capable of reversibly intercalating sodium ions. The cathode and anode are in contact with an electrolyte comprising a sodium salt dissolved in a non-aqueous solvent; and the anode and cathode are separated from one another by a membrane that is permeable to the electrolyte. The cathode comprises a layer of hollow $\gamma$-$Fe_2O_3$ nanoparticles disposed between two layers of carbon nanotubes. Preferably, a metallic current collector is provided in contact with one of the layers of carbon nanotubes. The sodium ion electrochemical cell can comprise the cathode in a discharged state (including fully discharged and partially discharged cathodes) or in a charged state.

The non-aqueous solvent component of the electrolyte can include a single solvent or a combination of two or more solvents. Non-limiting examples of such solvents include ethylene carbonate, propylene carbonate, dimethyl carbonate, and ethyl methyl carbonate, as well as combinations of two or more such carbonates. Non-limiting examples of other solvents include esters (e.g., gamma-butyrolactone, methyl formate, methyl acetate), ethers (e.g., diethoxyethane, tetrahydrofuran, 2-methyltetrahydrofuran, 1,3-dioxane), nitriles (e.g., acetonitrile), sulfolanes, and the like. The non-aqueous solvent of the sodium ion electrochemical cells described herein preferably comprises an organic carbonate, such as dimethyl carbonate (DMC), ethyl methyl carbonate (EMC), ethylene carbonate (EC), propylene carbonate (PC), or a combination of two or more of the foregoing. Preferably, the concentration of sodium salt in the non-aqueous solvent is in the range of about 0.1 molar (M) to about 5 molar, more preferably about 1 M to about 1.5 M (e.g., about 1.2 M).

The sodium salt of the electrolyte can be any sodium salt that is soluble in one or more of the non-aqueous solvents described above, e.g., $NaPF_6$, $NaBF_4$, $NaF_2BC_2O_4$, $NaB(C_2O_4)_2$, $NaClO_4$, $NaAsF_6$, $NaN(SO_2CF_3)_2$, $NaC(SO_2CF_3)_3$, $NaSO_3CF_3$, and $NaPF_3(CF_2CF_3)_3$. Preferably, the sodium salt comprises $NaPF_6$ or $NaClO_4$, e.g., at a concentration in the range of about 1M to about 1.5 M in the non-aqueous solvent.

In the sodium ion electrochemical cells described herein, each of the two layers of carbon nanotubes of the cathode independently can have an average thickness in the range of about 15 microns to about 50 microns. The active layer comprising the hollow $\gamma$-$Fe_2O_3$ nanoparticles and optional carbon nanotubes preferably has a thickness in the range of about 70 microns to about 140 microns.

In another aspect, the present invention provides a battery comprising a plurality of any of the sodium ion electrochemical cells described herein electrically connected together in series, parallel, or both.

Because of their high surface areas, small dimensions and exceedingly small nanometer interfaces, nanoparticles are especially difficult to fabricate into electrodes using conventional lamination electrode technologies, e.g., because of a tendency to flake off the current collector due to the difficulty in creating binder-particle contacts that cause lack of adhesion of the electrode. The application of a "filtration system" to isolate, yet capture in intimate contact with a carbon conductive matrix, such as carbon nanotubes (CNTs) or graphene addresses issue in the electrodes described herein. The cathode, however, also must include sodium ions to provide for a Na-ion secondary battery. That is, the battery can be built in the discharged state with a supply of sodium for the battery. It is inconvenient to initially include sodium in the anode since that affords a charged battery that can be more difficult to handle in practical operation.

This invention relates to sodium and sodium-ion cells and batteries comprising hollow iron-oxide vacancy-laden cathodes. The electrode materials described herein have a ratio of iron to oxygen less than one. The cathode comprises $\gamma$-$Fe_2O_3$, which can be made, e.g., by the Kirkendall method, and which has an inverse spinel crystal lattice structure. Nanoparticles are formed in a solution synthesis process and are grown into different size nanometer particles by annealing synthesized iron-oxide core-shell nanoparticles. In some embodiments, hollow $\gamma$-$Fe_2O_3$ NPs that are used herein typically have a particle outer size diameter of about 13.6 nm with about 3.3 nm thick walls. Because of the quite small nanometer size, the nanoparticles can be isolated by filtration, followed by solution sodiation, using a sodiating reagent such as sodium benzophenone, sodium napthalide, or sodium iodide, rinsing and matting to produce a discharged cathode material. In this way the nanoparticles can be cycled at high rate with high power. In one embodiment, such electrodes are formed, e.g., on filter paper, a glass fiber mat, a nylon fiber mat, paper or other mat materials. After drying the active electrode materials can be peeled off of the filtration mat, providing pliable and self-supporting sheet materials. The sheets are easily layered into many electrode assemblages (e.g., positive/separator/negative layer) and built into full sodium or sodium-ion full cell batteries.

Electrodes of this invention possess high-energy and high-power capabilities and can be used in rechargeable sodium and sodium-ion cells and batteries that include a suitable anode and electrolyte (e.g., sodium metal anode and sodium salt electrolyte) to form a full cell that is most preferably used in ambient-temperature sodium and sodium-ion cells and batteries.

Since the cathodes are rich in sodium and iron, they are expected to be low in cost compared to similar lithium metal oxide materials that may contain Co, Mn or Ni. The cathode materials can be easily synthesized, and exhibit high rates, high energy, and long cycle lifetimes in electrochemical cells. Such advances may enable the widespread use of sodium and sodium-ion batteries for many applications, particularly grid storage use. In the examples, the Na cations are predominately present in octahedral coordination as defined by the vacancies in the structure. Note that it is also possible for the Na to reside in available octahedral sites found natively in the structure, and the sodium cations preferentially are located in octahedral coordination in the $\gamma$-$Fe_2O_3$ transition metal oxide as well. Preferably, site disorder between the Na and the other metal cations is minimal, but is allowed for the purpose of this invention.

The first electrochemical charge of a cathode of the invention in a sodium battery electrolyte with Na metal as the anode typically exhibits a monotonically increasing voltage curve to a cut-off of about 4 V from the open-current voltage (OCV). This is indicative of the removal of sodium and electrons from the host hollow iron-oxide material. After that, the electrodes can be cycled between 1 V and 4 V versus the Na metal or hard carbon anode, or other suitable anode without significant losses in capacity. Thus, the cathode materials described herein possess high-rate and long life times. The nanoparticles are robust and sodiation of the nanoparticles does not affect their particle size, shape, or hollow character. This serves to stabilize the structure and allows for free mobility of sodium ions in a single phase intercalation reaction with very reversible cycling of the battery at a capacity of about 189 mAh/g at an average voltage of 2 V.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF PREFERRED EMBODIMENTS

Figure 1:
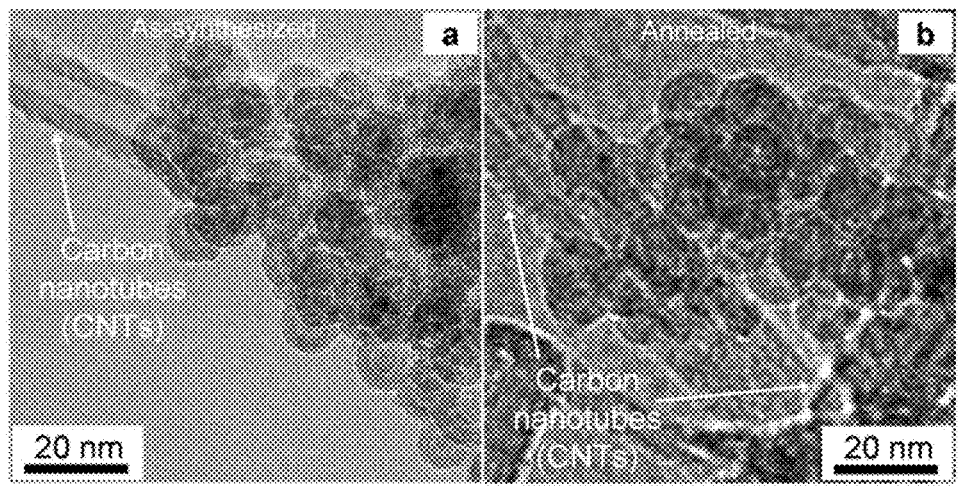
FIG. 1 depicts transmission electron micrographic (TEM) images of (a) an as-synthesized carbon nanotube (CNT)/$\gamma$-$Fe_2O_3$ nanoparticle (NP) composite material prior to annealing, and (b) after annealing.

This invention relates to energy storage devices, notably non-aqueous electrochemical cells and batteries and, more particularly, non-aqueous rechargeable sodium and sodium-ion electrochemical cells and batteries. Such cells can operate at ambient temperature. These rechargeable sodium and sodium-ion cells and batteries may be used for many energy storage applications, particularly electrical grid storage technologies. Other applications are possible for sodium and sodium-ion batteries including, but not limited to portable consumer products, tools, medical products, defense products, transportation, and aerospace products and other energy storage devices.

In one embodiment, this invention provides an electrode for sodium or sodium ion electrochemical cell and batteries. The electrode comprises a material of composition iron and oxygen (Fe and O) wherein the Fe/O ratio is less than one, and which has the gamma ($\gamma$) $Fe_2O_3$ crystal structure as defined by the X-ray diffraction (XRD) pattern. The $\gamma$-$Fe_2O_3$ phase consists of nanoparticles with a hollow interior and iron vacancies of anywhere between 3% to 90%, and preferably 44 to 77% of available iron sites (e.g., octahedral cation vacancies).

Materials and Methods.

A. Electrochemical Tests with Sodium Ion.

See Koo et al., *Chem Mater.*, 2013; 25:245-252 and the on-line Supporting Materials therefor, pp. S1-S12, published by the present inventors on Dec. 19, 2012, which are incorporated herein by reference in their entirety. Coin-type cells (Hohsen 2032) were assembled for sodium half-cell tests, where a fabricated NP electrode and a Na metal foil were used as the counter electrodes. The loading of the NP electrode was about 0.9 mg/$cm^2$. A glass fiber membrane (Whatman GF/F) was used as a separator and the electrolyte was 1.0 M $NaClO_4$ in propylene carbonate (PC) electrolyte or 1.0 M $NaPF_6$ in PC in the sodium half-cells. Half-cell cycles were operated at varying currents between 4.0 and 1.1 V versus (vs.) Na/$Na^+$ using an automated battery tester (Maccor) at ambient temperature. Drilled external cases sealed by KAPTON tapes were used for the cell assembly for in situ X-ray measurements (XANES and EXAFS) allowing the X-ray beam to penetrate through the entire cell, including the active materials. All cell assembly and disassembly operations were performed in a He-filled, dry, glovebox (oxygen level <2 ppm).

B. X-ray Absorption Spectroscopy (XANES, EXAFS).

In situ Fe K-edge (7112 eV) XANES/EXAFS measurements were conducted at the MRCAT 10-ID beamline at the Advanced Photon Source (APS) at Argonne National Laboratory to investigate the change in oxidation state of Fe atoms with $Na^+$ ion intercalation into the cation vacancies in the hollow iron oxide NPs. A scan was taken every 3 minutes with the monochromator measuring energy on the fly. An iron foil was put on the reference ion chamber and was measured with every scan. Ex situ samples were prepared by sandwiching the hollow NPs between KAPTON tapes. The reference standards were prepared by spreading thin, uniform layers of powders on KAPTON tape and stacking a few layers to attain the desired absorption step height. Each spectrum was normalized using ATHENA data processing software package. Alignment of each sample reference spectrum with respect to the Fe standard spectrum was within ±0.03 eV.

C. X-ray Diffraction.

X-ray diffraction measurements (XRD) were performed at beamline 13-ID-D of GSECARS at the Advanced Photon Source (APS) at Argonne National Laboratory. The X-ray beam (37 keV energy, corresponding to X-ray wavelength of $\lambda$=0.3344 Å) was focused to a 4 μm diameter spot with a Kirkpatrick-Baez mirror system. The distance and tilting of the MAR165-CCD detector were calibrated using a $CeO_2$ standard. The samples were prepared within KAPTON tapes in the same manner as XANES/EXAFS samples.

Synthesis of Hollow $\gamma$-$Fe_2O_3$ NPs.

Iron/iron oxide NPs 5.8 nm core/2.8 nm shell were obtained by air-oxidation of iron NPs synthesized in the presence of carbon nanotubes following the method described in Koo et al., *Nano Lett.*, 2012; 12: 2429-2435 and the on-line Supporting Materials therefor, pp. S-1 to S25, which are incorporated herein by reference in their entirety. After annealing at 200° C. for 12 hours, the core/shell NPs were transformed into the hollow NPs with a slightly increased shell thickness.

The core shell iron/iron oxide nanoparticles (7.2 nm core, 2.6 nm shell) were synthesized by air-oxidation of iron NPs according to the procedure of Cabot et al. *J. Am. Chem. Soc.*, 2007; 129:10358-10360. Thus, 0.7 mL of iron pentacarbonyl was injected into the octadecene solution containing 0.3 mL of oleylamine at 180° C. under nitrogen atmosphere. The solution immediately turned black with a slight temperature drop (about 2-3° C.). After that, the reaction mixture was kept at 180° C. for 30 minutes and then dry air was bubbled through the reaction solution at the same temperature for 1 minute (about 100 mL/min). In order to improve homogeneity of NPs and CNTs that were used as a current collector, NPs were synthesized in the presence of CNTs. In this case, 53 mg of multiwall carbon nanotubes (CNTs) were dispersed in 40 mL of 1-octadecene by sonication for 1 hour and 0.3 mL of oleylamine was mixed with the solution at room temperature. The final solution was cooled down to the room temperature and the product as precipitated and washed 4 times with excess (2-3 times) amount of acetone and methanol. TEM analysis indicated that similar size and morphology of core/shell and hollow NPs were obtained regardless of use of carbon nanotube during synthesis. Thermogravimetric analysis (TGA) showed that NPs used for fabrication of electrode contained about 3 wt % of capping ligands.

Synthesis of Solid NPs

Solid $\gamma$-$Fe_2O_3$ nanoparticles were synthesized following a modified recipe of Xie et al., *Pure Appl. Chem.*, 2006; 78:1003-1014. Thus, 0.71 g of iron(III)acetylacetonate, 2.58 g of 1,2-hexadecanediol, 1.90 mL of oleic acid, and 1.97 mL of oleylamine were mixed in 20 mL of benzyl ether at room temperature under vigorous stirring. The reaction solution was heated up to 200° C. under nitrogen and kept for 2 hours. The solution color gradually was changed from reddish brown to black. After that the reaction solution was heated up to 300° C. and kept at that temperature for 1 hour. After precipitating and washing the product with excess amount of acetone and methanol, solid iron oxide NPs were isolated. Then, the NPs were annealed in the same manner as the hollow NPs, forming solid $\gamma$-$Fe_2O_3$ nanoparticles. TGA indicated about 5 wt % of solid materials in the solution used for fabrication of electrode materials.

Electrode Fabrication

About 4.0 mg of multiwall CNTs were dispersed in 150 mL of isopropyl alcohol (IPA) and sonicated for 5 minutes. The solution of CNT was filtrated by vacuum through the glass fiber filter. As a result, a black paper made of CNTs was formed onto the vacuum filter. Then 15.0 mg of NPs/CNTs mixture (12.0 mg of NPs and 3.0 mg of CNTs, measured by TGA in air) was dispersed in IPA and vacuum-filtrated in the same manner through the layer formed by CNTs. After that, solution containing 4.0 mg of CNT was filtrated again providing second layer of CNTs in order to seal the NP layer. After drying remained solvents, the CNT-NPs composite was peeled off from the glass fiber filter. This free-standing CNT-NPs film was used as electrode without any additional processing (such as deposition on a metal current collector or mixing with polymer binders). The layered electrodes were annealed in an oven at 200° C. for 12 hours. This thermal treatment of the core/hollow shell iron oxide NPs results in the transformation of Fe/$Fe_3O_4$ core/hollow shell NPs into hollow $\gamma$-$Fe_2O_3$ nanoparticles. FIG. 1, Panel (a) shows the core/shell nanoparticles with carbon nanotubes, prior to annealing; whereas FIG. 1, Panel B shows the hollow nanoparticles that form after annealing.

After an electrode membrane (uncut) was fabricated by a vacuum filtration, the amount of iron oxide nanoparticles was measured by TGA in oxygen (25-800° C. at the heating rate of 6.5° C./min) which removes carbon nanotubes. In this temperature range $\gamma$-$Fe_2O_3$ converts into $\alpha$-$Fe_2O_3$, a weight of equivalent $\gamma$-$Fe_2O_3$ to $\alpha$-$Fe_2O_3$ was calculated based upon their densities ($\gamma$-$Fe_2O_3$: 5.49 $g/cm^3$, $\alpha$-$Fe_2O_3$: 5.28 $g/cm^3$). Tables 1 and 2 show that the weight of nanoparticles analyzed by TGA is very close to that used in fabrication, meaning that the fabrication method is loss-free. Moreover, three electrodes cut from the fabricated membrane had similar weight that confirms the uniformity of nanoparticles distribution in an electrode membrane. The weight of active material (nanoparticles) is represented in Tables 1 and 2. This weight was used in the capacity calculation.

TABLE 1

Hollow NPs electrode.

| Weight used in fabrication | | | Weight analyzed by $O_2$ TGA | | |
| --- | --- | --- | --- | --- | --- |
| CNT (bottom) | Hollow NPs on CNT | CNT (top) | Before | After ($\alpha$-$Fe_2O_3$) | Equivalent $\gamma$-$Fe_2O_3$ |
| 4.0 mg | 15.0 mg (12.0 mg of NPs + 3.0 mg of CNT) | 4.1 mg | 3.6085 mg | 1.8171 mg | 1.8894 mg |
| Hollow NPs = 51.95% | | | Hollow NPs = 52.36% | | |

| Individual Electrode Cuts | Electrode 1 | Electrode 2 | Electrode 3 |
| --- | --- | --- | --- |
| Total | 3.4419 mg | 3.4653 mg | 3.5188 mg |
| Active (52.36%) | 1.8022 mg | 1.8144 mg | 1.8424 mg |

TABLE 2

Solid NPs electrode.

| Weight used in fabrication | | | Weight analyzed by $O_2$ TGA | | |
| --- | --- | --- | --- | --- | --- |
| CNT (bottom) | Solid NPs + CNT | CNT (top) | Before | After ($\alpha$-$Fe_2O_3$) | Equivalent $\gamma$-$Fe_2O_3$ |
| 4.0 mg | 12.0 mg of NPs + 3.0 mg of CNT | 4.0 mg | 3.1523 mg | 1.5776 mg | 1.6403 mg |
| Solid NPs = 52.17% | | | Solid NPs = 52.04% | | |

| Individual electrode cuts | Electrode 1 | Electrode 2 | Electrode 3 |
| --- | --- | --- | --- |
| Total | 3.2522 mg | 3.1994 mg | 3.1663 mg |
| Active (52.04%) | 1.6924 mg | 1.6650 mg | 1.6477 mg |

Synchrotron X-Ray Diffraction Patterns and Absorption Spectroscopy on Hollow NPs XRD peaks of the hollow NPs are located at the same positions as those of bulk $\gamma$-$Fe_2O_3$ and XANES data obtained from the hollow NPs also showed similar near edge feature as standard $\gamma$-$Fe_2O_3$. However, the hollow NPs showed higher XRD peak intensity (about 1.27 times) at the (440) position, which corresponds with the presence of cation vacancies at octahedral sites. Simulated XRD patterns confirmed that the inverse spinel $\gamma$-$Fe_2O_3$ structure with extra Fe vacancies at mainly octahedral sites shows a higher (440) peak intensity. EXAFS study revealed the significantly low signal at Fe—Fe distance (2-3 Å) despite almost same intensity for Fe-0 signal (1-2 Å), which indicates that the first coordination shell (Fe-06) structure of bulk $\gamma$-$Fe_2O_3$ and hollow NP is the same, but vacancies appear in the second neighbor Fe—Fe interactions. Also the edge features of hollow NP are similar as $\gamma$-$Fe_2O_3$ suggesting the oxidation states is the same.

Results and Discussion.

Different forms of iron oxide NPs have been extensively studied for application as anode materials in which ion insertion/deinsertion is associated with conversion reactions, i.e., meaning subsequent reduction and oxidation between iron oxide and iron, respectively. In general electrodes based on conversion reactions permanently fade as a result of pulverization of the active materials due to subsequent volume contraction and expansion cycles. Performance fading can be minimized by carbon coating, graphene wrapping, or carbon fiber/nanotube mixing due to better connectivity of the active material or its fragments with the conductive media. Also, design of active materials with morphologies that have tolerance toward volume changes (e.g., hollow NPs) can increase anode stability.

Hollow $\gamma$-$Fe_2O_3$ NPs (about 13.6 nm average diameter with approximately 3.3 nm thick walls) were obtained by annealing of 5.8 nm/2.8 nm Fe/$Fe_3O_4$ core/shell NPs (see FIG. 1). The weight of hollow $\gamma$-$Fe_2O_3$ NPs in a composite electrode was about 45% of the total electrode mass. Synchrotron XRD and XANES/EXAFS on the hollow NPs revealed the presence of extra cation vacancies (44% of Fe sites, 1.32 Fe atoms) in the inverse spinel iron oxide structures. Note that for better connectivity between the electrode material and current collector, the hollow iron oxide NPs were synthesized in the presence of CNTs.

Two electrode fabrication designs were explored: (1) a conventional process and (2) encapsulation of active material between the layers of carbon nanotubes (CNTs). In the conventional design, as-synthesized hollow $\gamma$-$Fe_2O_3$ NPs were mixed with carbon black and tertiary-amylbenzene (TAB) binder. Such electrodes demonstrated very poor performance; for example, the $Na^+$ ion capacity dramatically faded down after the first few cycles. In contrast, an electrode comprising a layer 1 of hollow $\gamma$-$Fe_2O_3$ NP active material disposed between two layers 2 of CNTs (FIG. 2) was found to improve the stability of the $Na^+$ ion electrode. Both designs surprisingly demonstrated limited cyclability when used as anodes, most likely because of the pulverization of NPs during $Na^+$ ion insertion/deinsertion, which was not observed in previous work on $Li^+$ ion insertion/deinsertion. Thus, despite the promising morphology, hollow $\gamma$-$Fe_2O_3$ NPs have not been found to be suitable as anode active materials in $Na^+$ ion battery applications, to date. Because of the difficulties observed with the hollow $\gamma$-$Fe_2O_3$ NP-based anodes, cathode applications were explored.

In situ XANES/EXAFS measurements were conducted at the Fe K-edge (7112 eV) to monitor the oxidation state of Fe atoms during $Na^+$ ion intercalation into hollow $\gamma$-$Fe_2O_3$ NPs. The $Na^+$ capacity was calculated based upon the weight of iron oxide NPs in an electrode measured by $O_2$ thermogravimetric analysis (TGA). A pure CNT electrode showed a negligible capacity up to 1.1 V at the first charging state. A gradual reduction of iron in $\gamma$-$Fe_2O_3$ NPs was observed as a result of the $Na^+$ intercalation into the active material. However, plotting Fe oxidation states obtained from linear combination fitting (LCF) of XANES spectra versus sodium uptake revealed significantly slower reduction of Fe atoms during $Na^+$ intercalation if it was assumed that the charge is stored primarily at the iron atoms. In fact, the iron reduction rate was slower than expected based on theoretical considerations. Three regions of $Na^+$ ion intercalation were identified: 0-0.8 $Na^+$, 0.8-1.4$Na^+$, and 1.4-1.8$Na^+$.

In order to elucidate $Na^+$ intercalation behavior into the $\gamma$-$Fe_2O_3$ inverse spinel crystal structure, in situ EXAFS data were analyzed for six points chosen from three characteristic regions of the dependence identified above. EXAFS data demonstrated an increase of the signal intensity at R of about 2-3 Å corresponding to an Fe—Fe distance only after intercalation of about 1.4 $Na^+$ (Region III), indicating formation of a rock salt-like structure. A shoulder was observed at about R=1.5 Å after intercalation of more than 1.4 $Na^+$, most likely corresponding to a larger Fe-0 distance (2.16 Å) characteristic for a rock salt FeO structure. Thus, the XANES and EXAFS data indicate intercalation of about 1.4 $Na^+$ ions into structural defects of hollow $\gamma$-$Fe_2O_3$ NPs. XRD data on the hollow $\gamma$-$Fe_2O_3$ NPs discharged to 1.1 V (middle of the Region II) revealed the decreased intensity of (440) reflexes indicating $Na^+$ intercalation into octahedral cation vacancies.

Figure 3:
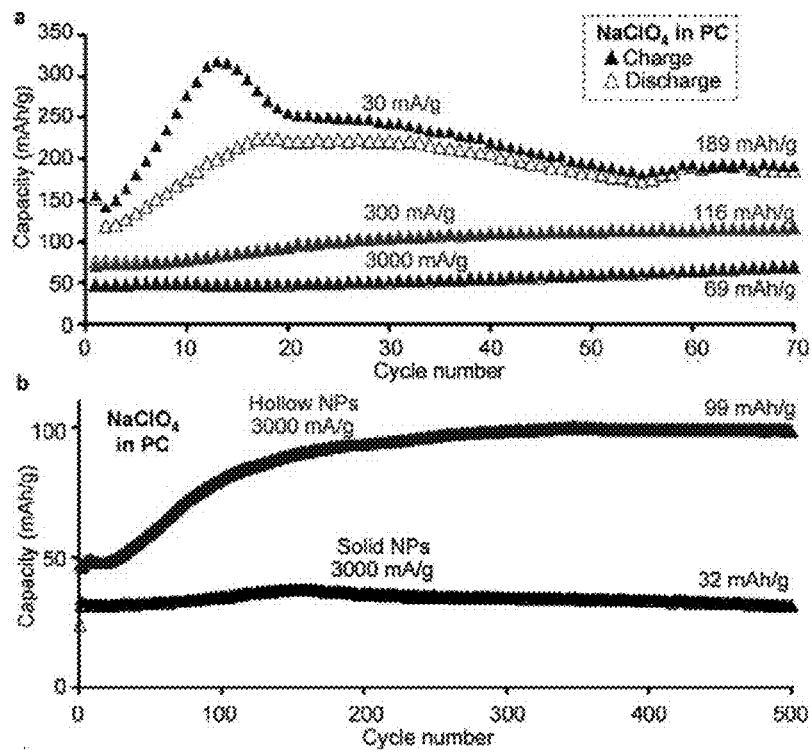
FIG. 3 provides graphs of (a) capacity versus cycle number observed upon charging and discharging a CNT/hollow $\gamma$-$Fe_2O_3$ NP cathode material as described herein in a half cell with a sodium counter ion in an electrolyte comprising $NaClO_4$ in propylene carbonate (PC) at rates of 30, 300 and 3000 mA/g in the voltage range of 4.0 to 1.1 over 70 cycles; and (b) a corresponding plot for the a CNT/hollow $\gamma$-$Fe_2O_3$ NP cathode material at 3000 mA/g over 500 cycles compared to a cathode material comprising solid (not hollow) $\gamma$-$Fe_2O_3$ NPs.

The hollow $\gamma$-$Fe_2O_3$ NP/CNT-based electrode was cycled in the high voltage range (4.0-1.1 V) with Na metal as counter electrode and 1.0 M $NaClO_4$ in PC as electrolyte. The electrode showed large reversible capacity (189 mAh/g) corresponding to 1.1 $Na^+$ at the current density of 30 mA/g with 99.0% Coulombic efficiency at high rate; see FIG. 3, Panel (a). Surprisingly, an excellent capacity retention was observed for more than 500 cycles with fairly large capacity (99 mAh/g) at a very fast rate (3000 mA/g=50 C); see FIG. 3, Panel (b). This is believed to be the first $Na^+$ cathode material showing high-rate performance while maintaining capacity. Transmission electron microscopy (TEM) of the hollow $\gamma$-$Fe_2O_3$ NPs before and after high-rate cycling revealed that the hollow morphology was preserved. Improved crystallinity of cycled hollow NPs (confirmed by XRD data, high-resolution TEM, and electron diffraction) indicate that $Na^+$ ions indeed intercalate through the iron oxide shell ruling out a surface reaction. Increased intensity of the (311) XRD peak and its narrow shape after cycling was observed, which can be attributed to the ordering of oxygen framework as a result of $Na^+$ ion diffusion. Extensive cycling at high rate also surprisingly led to the increased capacity (about 99 mAh/g) for the hollow $\gamma$-$Fe_2O_3$ NPs relative to solid $\gamma$-$Fe_2O_3$ NPs (about 32 mAh/g). This observation can be attributed to the ordering of vacancies into channels easily accessible for the intercalation of sodium ions.

The cycling of the hollow $\gamma$-$Fe_2O_3$ NP/CNT electrode in the voltage range of 4.0-1.1 V at slow rate (30 mA/g) resulted in anomalous Coulombic efficiency up to about 55 first cycles showing a higher charge capacity than discharge capacity. Extra capacity at high voltage (3.5-4.0 V), which is not associated with the intercalation of $Na^+$ ions, most likely has the same origin as the anomalous Coulombic efficiency (charge capacity>discharge capacity) of the initial cycles obtained at the slow (30 mA/g) rate. In order to investigate the origin of the anomalous capacity a rate study on the same electrode was performed under a standard condition (1.0 M $NaClO_4$ in PC with Na metal as a counter electrode) at fast rate (300 mA/g) and slow rate (30 mA/g), alternately. The initial slow rate cycling had significantly larger charging capacity than discharging capacity and the irreversibility at slow rate was significantly reduced after about 50 cycles, indicating that the anomalous Coulombic efficiency is kinetically controlled and does not take place at fast rate.

Controlled experiments were conducted with electrodes made from (i) hollow $\gamma$-$Fe_2O_3$ NPs (no CNTs) only, (ii) solid $\gamma$-$Fe_2O_3$ NPs sealed between two layers of CNTs, and (iii) CNTs only to investigate where the side process takes place. In the case of cathodes assembled from hollow $\gamma$-$Fe_2O_3$ NPs by filtering colloidal suspension of NPs through the separator membrane, a significantly lower capacity was observed; however, no anomalous Coulombic efficiency has been evident. On the other hand, the composite solid $\gamma$-$Fe_2O_3$ NP/CNT cathode showed anomalous Coulombic efficiency at slow cycling rate (30 mA/g), indicating that the side reaction occurs at the surface of CNTs. Indeed the control experiments with electrodes made from CNTs only confirmed this assumption. Thus significant anomalous Coulombic efficiency has been observed during the cycling of the CNTs between 4.0 and 1.1 V at slow rate. $NaClO_4$ dissolved in PC was used as electrolyte in these experiments. This electrolyte previously has been reported to be stable below 4.0 V; however, the experimental results above indicate that CNTs catalyze the oxidative decomposition of PC that was known to occur at significantly higher voltage. A trace of NaCl was detected in synchrotron XRD patterns taken of the electrode after slow rate charging, which confirms the reduction of $NaClO_4$.

The observed oxidative decomposition of PC was slow, and does not appear to affect the electrode performance at fast cycling such as 300 mA/g and 3000 mA/g. This is similar to the irreversible electrolyte decomposition that has been observed only at slow scan rate in graphite intercalation compounds. In order to investigate the effects of electrolyte salt on the performance of the electrode at slow rate, electrochemical cycling of CNT-based electrodes in $NaPF_6$/PC electrolyte were performed. No anomalous Coulombic efficiency was observed for the CNT-based electrode upon cycling in NaPF$_6$/PC electrolyte. Similarly, no anomalous Coulombic efficiency at slow (30 mA/g) rate was observed upon cycling of the hollow γ-Fe$_2$O$_3$NP/CNT electrode at different rates in NaPF$_6$/PC electrolyte. The capacities at all rates were slightly lower with NaPF$_6$/PC electrolyte compared to NaClO$_4$/PC electrolyte.

Figure 4:
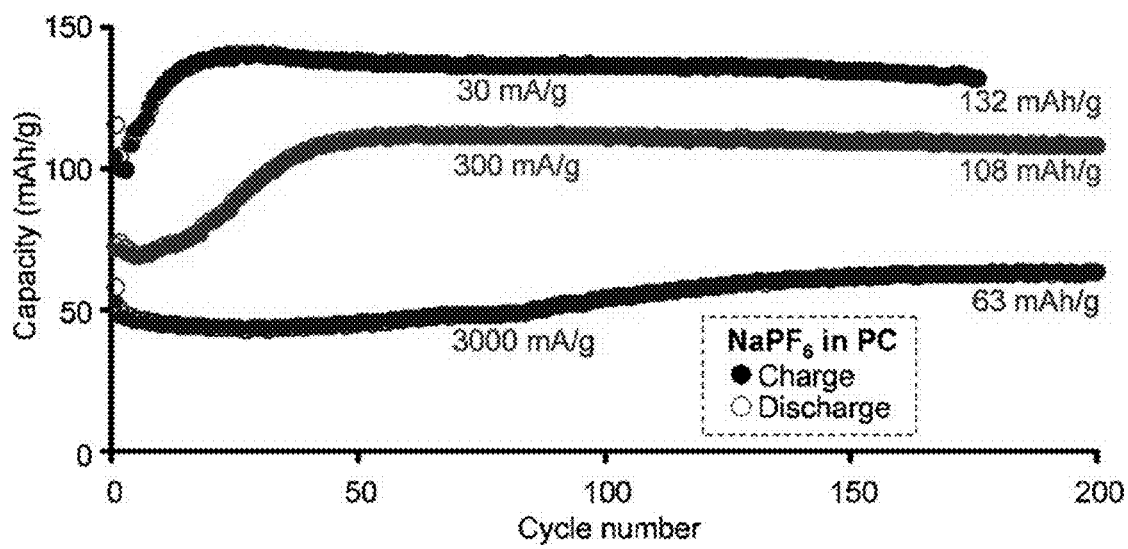
FIG. 4 provides graphs of capacity versus cycle number observed upon charging and discharging a CNT/hollow $\gamma$-$Fe_2O_3$ NP cathode material as described herein in a half cell with a sodium counter ion in an electrolyte comprising $NaPF_6$ in propylene carbonate (PC) at rates of 30, 300 and 3000 mA/g in the voltage range of 4.0 to 1.1 over about 200 cycles.

A significant increase in fast rate capacity after slow rate cycles was observed both in NaClO$_4$/PC and NaPF$_6$/PC electrolytes for the hollow γ-Fe$_2$O$_3$NP/CNT electrode. Thus, a 70 mAh/g capacity at the 13th cycle evolved up to 94 mAh/g at the 20th cycle in the case of NaPF$_6$/PC, and a 99 mAh/g capacity at the 13th cycle went up to 140 mAh/g at the 20th cycle in case of NaClO$_4$/PC. This can be explained as effective crystal organization provided during the slow rate cycling toward making an efficient ionic pathway. Although the Na$^+$ ion battery cells showed slightly less capacity with NaPF$_6$/PC electrolyte during extensive cycles (108 mAh/g at 300 mA/g and 63 mAh/g at 3000 mA/g at 200th cycle) as compared with the NaClO$_4$/PC case, these defect-based electrodes still show capacities comparable with the capacities demonstrated by typical Na$^+$ ion cathode materials. Overall, very good capacity retention was maintained for the hollow γ-Fe$_2$O$_3$NP/CNT electrode even up to 200 cycles with the NaPF$_6$/PC electrolyte (see FIG. 4).

Hollow γ-Fe$_2$O$_3$ NPs encapsulated between CNT layers demonstrated high capacity (189 mAh/g) and excellent Coulombic efficiency (99.0%) when used as a cathode in a sodium ion-based electrochemical cell, and, for the first time, showed superior rate performance during extensive cycling as cathodes with Na$^+$ ions. Thus, a capacity of 99 mAh/g was achieved at 3000 mA/g (50 C) after more than 500 cycles with NaClO$_4$/PC as electrolyte. The crystal structure of the hollow γ-Fe$_2$O$_3$ NPs is preserved until all vacancies are filled with Na+ ions. Particle morphology also is maintained, verifying the stability of the hollow NPs. Surprisingly, the capacity of the cell with the Na$^+$ ions was only 2% and 30% lower as compared with Li$^+$ ion cells at slow and high cycling rates, respectively. The hollow γ-Fe$_2$O$_3$ NP/CNT-based cathode does not have integral sodium ion source and thus requires Natcontaining anode material in a full cell. Optionally, hollow NPs can be pretreated with sodium ions to allow for more flexibility in the choice of anode materials.

Exemplary Electrochemical Cell and Battery.

Figure 2:
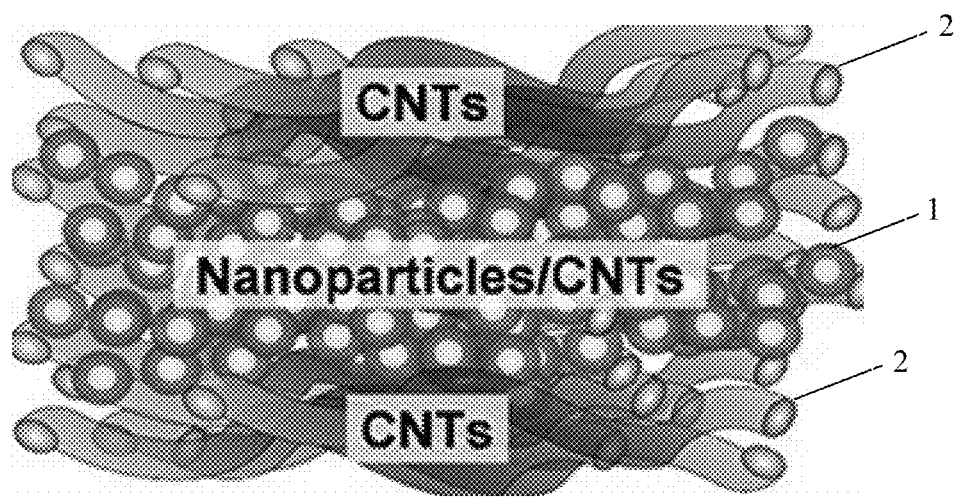
FIG. 2 schematically illustrates a cathode structure as described herein comprising a CNT/hollow $\gamma$-$Fe_2O_3$ NP composite active layer between two layers of CNT.
Figure 5:
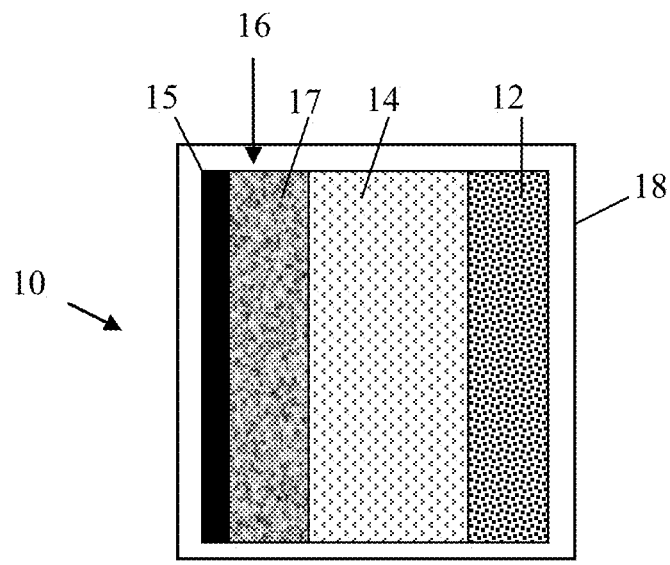
FIG. 5 provides a schematic representation of a sodium ion electrochemical cell described herein.
Figure 6:
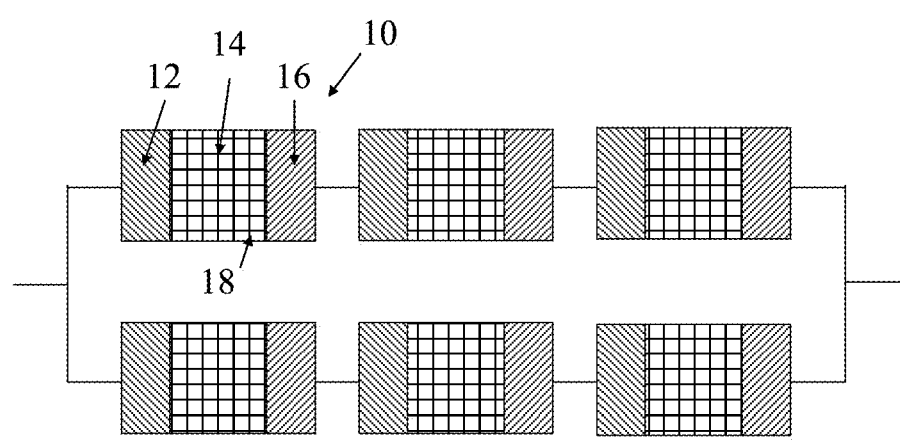
FIG. 6 provides a provides a schematic representation of a battery comprising a plurality of electrically connected sodium ion electrochemical cells as described herein.

A detailed schematic illustration of a sodium electrochemical cell 10 of the invention is shown in FIG. 5. Cell 10 comprises negative electrode 12 separated from positive electrode 16 by a separator 14 saturated with the electrolyte, all contained in insulating housing 18 with suitable terminals (not shown) being provided in electronic contact with negative electrode 12 and positive electrode 16 of the invention. Positive electrode 16 comprises metallic collector plate 15 and active layer 17 comprising the layered CNT/γ-Fe$_2$O$_3$-CNT/CNT sheet structure as described herein, e.g., as shown in FIG. 2. Binders and other materials, such as carbon, normally associated with both the electrolyte and the negative and positive electrodes are well known in the art and are not described herein, but are included as is understood by those of ordinary skill in this art. In preferred embodiments, however, binders for the cathode can be omitted. FIG. 6 provides a schematic illustration of one example of a battery in which two strings of electrochemical sodium cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A discharged cathode for a sodium ion electrochemical cell comprising a layer of hollow γ-Fe$_2$O$_3$ nanoparticles disposed between two layers of carbon nanotubes; wherein the hollow γ-Fe$_2$O$_3$ nanoparticles comprise a crystalline shell of γ-Fe$_2$O$_3$ including iron cation vacancies within the crystal structure thereof and defining a cavity within the nanoparticles; and sodium ions are intercalated within at least some of the cation vacancies of the hollow γ-Fe$_2$O$_3$ nanoparticles.

2. The discharged cathode of claim 1 further comprising a metallic current collector in contact with one of the layers of carbon nanotubes.

3. The discharged cathode of claim 1 wherein the layer of hollow $\gamma\text{-Fe}_2\text{O}_3$ nanoparticles also comprises carbon nanotubes admixed therewith.

4. The discharged cathode of claim 1 wherein the hollow $\gamma\text{-Fe}_2\text{O}_3$ nanoparticles have an average particle size in the range of about 3.5 to about 17 nm, and the crystalline shells of individual nanoparticles have an average thickness in the range of about 1.1 to about 6 nm.

5. The discharged cathode of claim 1 wherein the layer of hollow $\gamma\text{-Fe}_2\text{O}_3$ nanoparticles has an average thickness in the range of about 70 to about 140 µm.

6. The discharged cathode of claim 1 wherein each of the two layers of carbon nanotubes independently has an average thickness in the range of about 15 to about 50 µm.

7. The discharged cathode of claim 1 wherein the carbon nanotubes have an average tube diameter in the range of about 1.5 to about 15 nm and an average tube wall thickness in the range of about 1 to about 6 nm.

8. The discharged cathode of claim 3 wherein the carbon nanotubes admixed with the hollow $\gamma\text{-Fe}_2\text{O}_3$ nanoparticles have an average tube diameter in the range of about 1.5 to about 15 nm and an average tube wall thickness in the range of about 1 to about 6 nm.

9. The discharged cathode of claim 1 wherein the hollow $\gamma\text{-Fe}_2\text{O}_3$ nanoparticles intercalate about 1 to about 1.5 moles of sodium ions per mole of $\gamma\text{-Fe}_2\text{O}_3$.

10. A sodium ion electrochemical cell comprising the discharged cathode of claim 1 and an anode capable of reversibly intercalating sodium ions; wherein the cathode and anode are in contact with an electrolyte comprising a sodium salt dissolved in a non-aqueous solvent; and wherein the anode and cathode are separated from one another by membrane that is permeable to the electrolyte.

11. The electrochemical cell of claim 10 wherein the non-aqueous solvent comprises an organic carbonate.

12. The electrochemical cell of claim 10 wherein the sodium salt comprises $\text{NaPF}_6$ or $\text{NaClO}_4$ at a concentration in the range of about 1 to about 1.5 M in the non-aqueous solvent.

13. A battery comprising a plurality of electrochemical cells of claim 10 electrically connected together in series, parallel, or both.

14. A sodium ion electrochemical cell comprising a cathode and an anode in contact with an electrolyte comprising a sodium salt dissolved in a non-aqueous solvent; wherein the cathode and anode are capable of reversibly intercalating sodium ions and are separated from one another by membrane that is permeable to the electrolyte; and wherein the cathode comprises a layer of hollow $\gamma\text{-Fe}_2\text{O}_3$ nanoparticles disposed between two layers of carbon nanotubes, individual hollow $\gamma\text{-Fe}_2\text{O}_3$ nanoparticles comprising a crystalline shell of $\gamma\text{-Fe}_2\text{O}_3$ including iron cation vacancies capable of reversibly intercalating sodium ions.

15. The electrochemical cell of claim 14 wherein the non-aqueous solvent comprises an organic carbonate.

16. The electrochemical cell of claim 14 wherein the sodium salt comprises $\text{NaPF}_6$ or $\text{NaClO}_4$ at a concentration in the range of about 1 to about 1.5 M in the non-aqueous solvent.

17. The electrochemical cell of claim 14 wherein the layer of hollow $\gamma\text{-Fe}_2\text{O}_3$ nanoparticles of the cathode also comprises carbon nanotubes admixed therewith.

18. The electrochemical cell of claim 14 wherein the hollow $\gamma\text{-Fe}_2\text{O}_3$ nanoparticles of the cathode have an average particle size in the range of about 3.5 to about 17 nm, and individual nanoparticles comprise a crystalline $\gamma\text{-Fe}_2\text{O}_3$ shell having an average thickness in the range of about 1.1 to about 6 nm.

19. The electrochemical cell of claim 14 wherein the layer of hollow $\gamma\text{-Fe}_2\text{O}_3$ nanoparticles of the cathode has an average thickness in the range of about 70 to about 140 µm.

20. The electrochemical cell of claim 14 wherein each of the two layers of carbon nanotubes of the cathode independently has an average thickness in the range of about 15 to about 50 µm.

21. The electrochemical cell of claim 14 wherein the carbon nanotubes have an average tube diameter in the range of about 1 to about 25 µm and an average tube wall thickness in the range of about 1 to about 6 nm.

22. The electrochemical cell of claim 17 wherein the carbon nanotubes admixed with the hollow $\gamma\text{-Fe}_2\text{O}_3$ nanoparticles have an average tube diameter in the range of about 1.5 to about 15 nm and an average tube wall thickness in the range of about 1 to about 6 nm.

23. The electrochemical cell of claim 14 wherein the hollow $\gamma\text{-Fe}_2\text{O}_3$ nanoparticles of the cathode are capable of intercalating about 1 to about 1.5 moles of sodium ions per moles of $\gamma\text{-Fe}_2\text{O}_3$.

24. A battery comprising a plurality of electrochemical cells of claim 14 electrically connected together in series, parallel, or both.

* * * * *